(No Model.)  2 Sheets—Sheet 1.

J. R. HOWARD.
COTTON CULTIVATOR.

No. 257,009. Patented Apr. 25, 1882.

Witnesses:
N. C. McArthur,
M. R. Keyworth

Inventor,
J. R. Howard,
per J. W. Alexander
Attorney.

(No Model.) 2 Sheets—Sheet 2.
J. R. HOWARD.
COTTON CULTIVATOR.
No. 257,009. Patented Apr. 25, 1882.
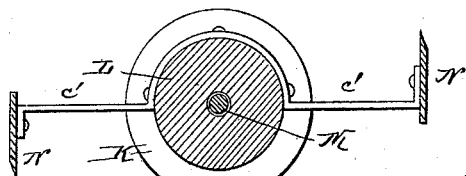
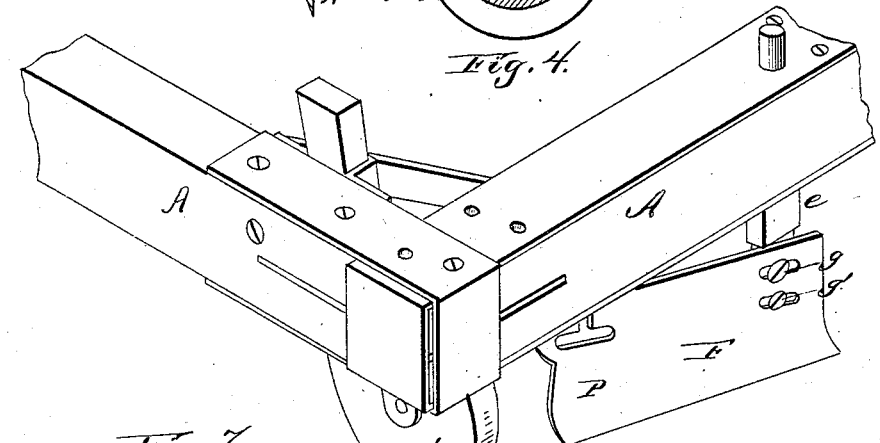
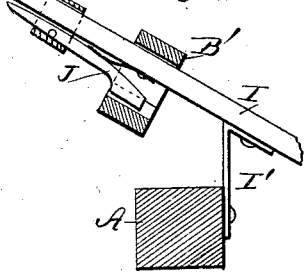
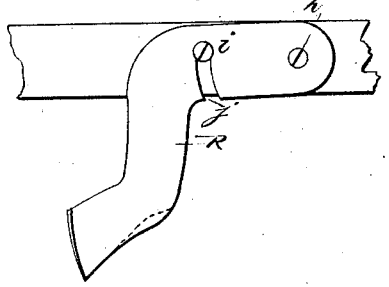
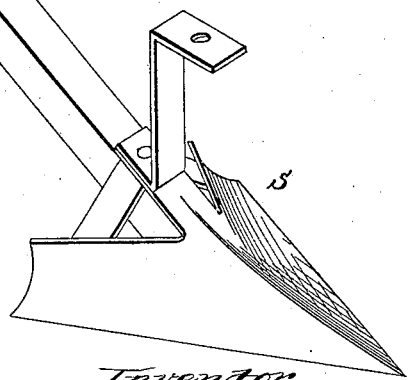

UNITED STATES PATENT OFFICE.

JOSIAH R. HOWARD, OF CLINTON, NORTH CAROLINA.

COTTON-CULTIVATOR.

SPECIFICATION forming part of Letters Patent No. 257,009, dated April 25, 1882.

Application filed February 23, 1882. (No model.)

*To all whom it may concern:*

Be it known that I, JOSIAH R. HOWARD, of Clinton, in the county of Sampson and State of North Carolina, have invented certain new and useful Improvements in Cotton-Cultivators; and I do hereby declare that the following is a full, clear, and exact description thereof, reference being had to the accompanying drawings, and to the letters of reference marked thereon, which form part of this specification, in which—

Figure 1:
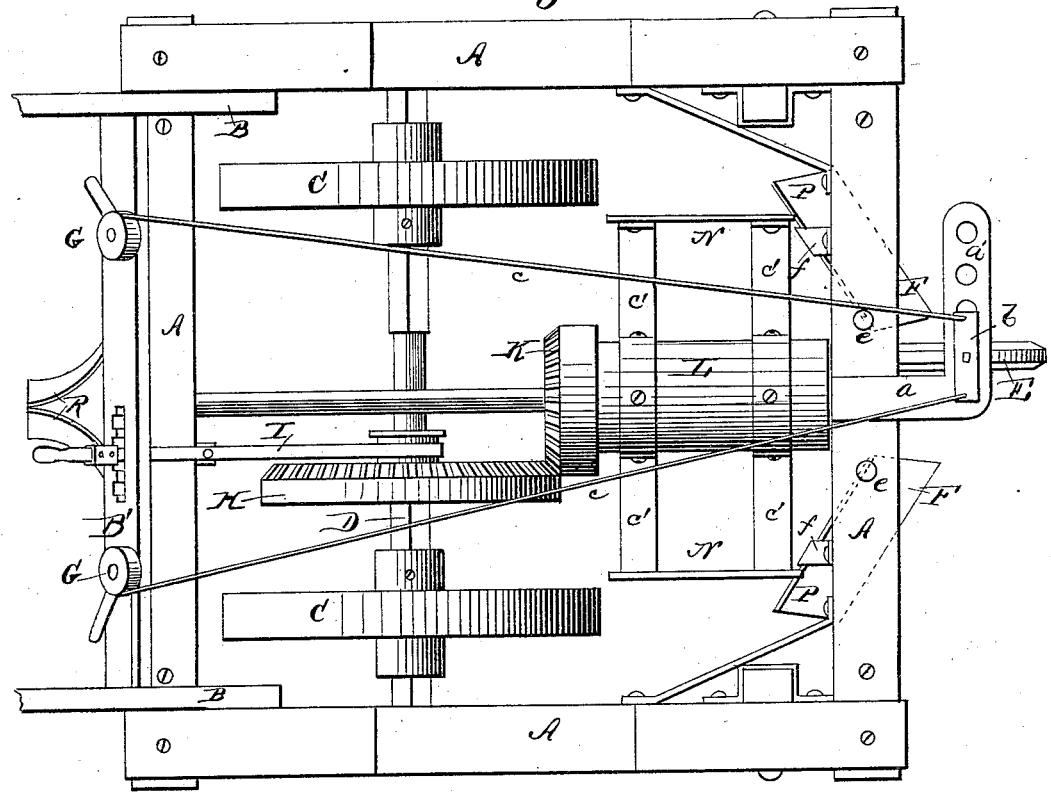
Figure 2:
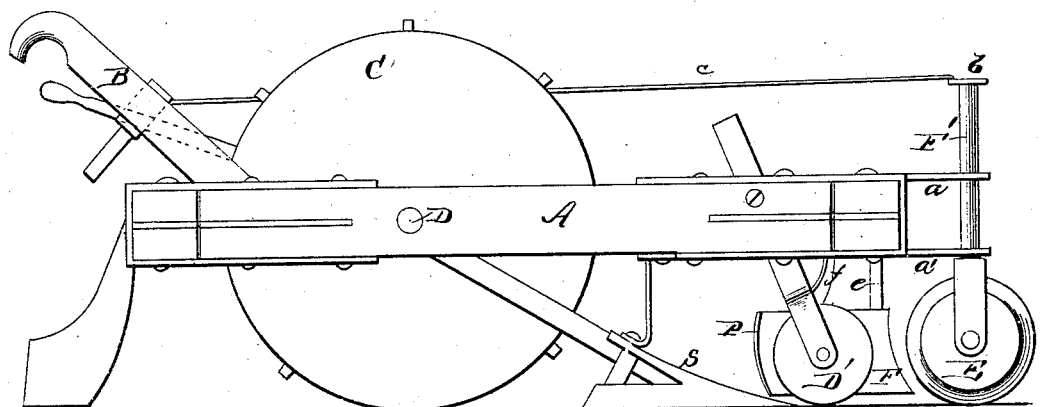

Figure 1 is a plan view; Fig. 2, a side elevation; and Figs. 3, 4, 5, 6, and 7 are details of parts of my invention.

This invention relates to machines which are designed for chopping out cotton-plants, scraping the sides of the rows or hills, and throwing about the roots of the plants loose earth.

The nature of my invention consists mainly in a novel combination, in a two-wheel adjustable transporting-frame, of adjustable scrapers, which can be set at different degrees of inclination, one or more rotary scrapers, the rotation of which can be stopped or started at the pleasure of the attendant, and vertically-adjustable blades which will scrape loose earth about the plants, as will be hereinafter explained.

The invention also consists in a front guide-wheel arranged to one side of the space left between the scrapers and controlled by means of a cross-head, ropes, or chains extended back to hand-winches or drums located on the stilt-bar in convenient position to the attendant walking behind the machine, as will be hereinafter explained.

Other features of my invention, together with those above referred to, will be made plain from the following description.

The draft-frame A is of rectangular form, and is composed of two transverse beams united to longitudinal beams by means of loops and bolts in such manner that the latter beams can be adjusted for expanding or contracting the width of the frame. To the longitudinal beams the stilts or handles B are rigidly secured, and these are connected together by a cross-bar, B', which should be made so that it will admit of the lateral extension or contraction of the side bars of frame A. The object of this feature of my machine is to adjust the handles or stilts to suit the convenience of different persons.

C C are traction driving-wheels, applied by means of set-screws on a transverse axle, D, and provided with teeth on their peripheries, which prevent the wheels from slipping.

The front end of the frame A is mounted on wheels D' D', applied to standards that are passed through straps and secured by clamp-screws. This allows the front end of the frame A to be adjusted higher or lower, as may be required. Another wheel, E, is applied at the front of the machine, and used as a guide-wheel, and also as the means for preventing the scrapers F F from being injured by roots and stumps. This guide-wheel E is beveled, as shown, and it is applied to a standard, F', which is free to swivel in brackets $a$ $a'$, secured to the front cross-beam of frame A. This guide-wheel E is arranged on one side of the space left between the scrapers F F, so that it will not run on the plants. A cross-head, $b$, is secured to the upper end of the swivel-standard F', and the ends of this cross-head are connected by ropes or chains $c$ to drums G G, which are pivoted to the cross-bar B' of the handles B, and provided with handles G'. By these means the attendant can conveniently turn the wheel E to the right or left, and thus guide the machine properly along the rows.

H designates a large beveled spur-wheel, which is applied on the axle D so as to turn with it, but which can be adjusted laterally by means of a hand-lever, I. This lever I is connected loosely to the hub of the bevel-wheel H, and has its fulcrum on a standard, I'. The rear portion of the lever I is provided with a latch, J, which engages with notches in the cross-bar B'. By means of lever I wheel H can be caused to engage with a beveled pinion, K, or disengaged therefrom at pleasure, whether the machine be moving forward or at rest. The pinion K is fast on the rear end of a drum, L, which is free to turn on a central longitudinal shaft, M, which is sustained by the transverse beams of the frame A.

To the drum L, I suitably secure radial arms $c'$, and to the extremities of these arms I secure chopping-blades or hoes N, which are designed for thinning out the plants, leaving them in hills at suitable distances apart.

P P designate concavo-convex scraping-blades, the inner edges of which are curved, as shown in Fig. 4, and their lower edges inclined downward and backward. Each one of these scrapers is secured to a standard, e, depending from the front beam of frame A, and also to a brace, f, also depending from said beam. Bolts g g' are used to secure the scrapers to the standards and braces, which bolts pass through slots in the scrapers of such shapes that the latter can be adjusted to or from each other or fixed at different inclinations laterally. These scrapers cut away grass and weeds from the sides of the rows of plants and deliver the trash in the furrows between the rows.

To the rear transverse beam of frame A, and equidistant from the middle of the length thereof, are pivoted two gravitating blades, R R, which are designed for throwing loose earth about the roots of the plants. The lower limbs of these blades are directed inward and backward, and their lower edges are curved forward, so as to scrape up the loose earth and leave it in the best position for hilling up. The blades R are stayed inside of their pivoted connections h by means of bolt-heads i, slots j being made in the blades for allowing them to rise and fall and accommodate themselves to the surfaces over which their lower edges are drawn.

S S designate double-pointed shovel-plows, which are secured by their standards and braces to the two side beams of the frame A, and designed for loosening the soil in the furrows between the rows of plants, and at the same time turning under the grass, &c., delivered into the furrows by the scrapers F F.

Having thus fully described my invention, what I claim as new, and desire to secure by Letters Patent, is—

1. The combination of the adjustable draft-frame A, pinion K, revolving chopper N, guide-wheel E, supporting-wheels D' D', scraper F, and the gravitating blades R, all constructed and arranged to operate substantially as set forth.

2. The combination, with the draft-frame and its supporting-wheels, of rotary choppers, adjustable scrapers, furrow-plows, and gravitating earthing-up blades, substantially as and for the purposes described.

3. In a cotton-chopper, the pivoted gravitating earthing-up blades R R, formed as shown, in combination with the heads i and slots j, substantially as described.

In testimony that I claim the foregoing as my own I affix my signature in presence of two witnesses.

J. R. HOWARD.

Witnesses:
R. H. HUBBARD,
JOHN SAMPSON.